United States Patent
DeVries

[15] 3,687,533
[45] Aug. 29, 1972

[54] SEQUENCE CAMERA

[72] Inventor: Richard Alan DeVries, New Brighton, Minn.

[73] Assignee: Minnesota Mining and Manufacturing Company, St. Paul, Minn.

[22] Filed: Feb. 2, 1970

[21] Appl. No.: 7,529

[52] U.S. Cl. ...................................352/121, 95/31 EL
[51] Int. Cl. ..................................................G03b 17/46
[58] Field of Search........352/84, 121; 95/11.5 A, 11, 95/12, 15, 31 R, 31 AC, 31 EL, 34, 61, 78 R

[56] References Cited

UNITED STATES PATENTS

| | | | |
|---|---|---|---|
| 3,011,416 | 12/1961 | Hammer | 95/31 E |
| 3,252,370 | 5/1966 | Luther | 95/31 E |
| 2,464,686 | 3/1949 | Holbrook | 95/31 AC |
| 1,692,092 | 11/1928 | Oehmichen | 352/225 |
| 3,152,331 | 10/1964 | Clay | 95/31 EL |

*Primary Examiner*—Samuel S. Matthews
*Assistant Examiner*—Russell E. Adams, Jr.
*Attorney*—Kinney, Alexander, Sell, Steldt & Delahunt

[57] ABSTRACT

A compact self-contained sequence camera is adapted to be loaded with film by insertion of a film cartridge.

10 Claims, 5 Drawing Figures

PATENTED AUG 29 1972

INVENTOR
R. ALAN DeVRIES
BY Kinney, Alexander,
Sell, Steldt & DeLa Hunt
ATTORNEYS INVENTOR.
R. ALAN DeVRIES
BY Kinney, Alexander
Sell, Steldt & DeLaHunt
ATTORNEYS 3,687,533

SEQUENCE CAMERA

The present invention provides an improved sequence camera—a camera that advances and exposes a frame of film at predetermined intervals, making it useful, for example, for surveillance of a retail store, bank, or the like. The improved camera is compact, self-contained, and of the utmost simplicity to install and operate. It is loaded with a film cartridge that is inexpensive enough in construction to be discarded after a single use, and yet the camera mechanism is also simple and inexpensive.

Part of the simplicity of the camera and cartridge arises from use of nonperforated film in the cartridge. The film is wound in a supply roll inside the cartridge and extends to a take-up roll, with a portion of the film between the supply and take-up rolls being exterior to the cartridge for engagement by film-metering mechanism and for photographic exposure in a camera of the invention. The cartridge is inserted in a camera of the invention by laying the cartridge on a base plate in a cartridge-receiving compartment, and when the cartridge is in the compartment, the exterior length of film lies immediately in back of a framing plate having a framing aperture in line with the light path defined by the camera lens.

The film-metering mechanism in the camera includes a drive roller and an idler roller, which are spring-biased together but conveniently spread apart to receive the exterior length of nonperforated film. A pressure plate is positioned in line with the framing aperture in the forming plate and is adapted for automatic reciprocal movement toward and away from the framing plate during a cycle of camera operation to press the area of film being exposed into a flat focal plane. The pressure plate is normally spaced from the back of the framing plate between cycles of camera operation, so the exterior length of film from the cartridge is conveniently inserted between the framing plate and pressure plate when the cartridge is loaded into the camera. A rotatable spool-drive-pin extends from the base plate and drivingly engages in a hub recess in the take-up spool within the cartridge.

Drive means within the camera drives the film metering mechanism, spool-drive-pin, and pressure plate through their cycle of operation, and timer means energizes the drive means at predetermined intervals. The whole apparatus is compact and contained within a single housing, and the camera may be attached to a wall or the like through a single pedestal and electrically connected to a 110-volt wall outlet. After installation, the uncomplicated mechanism of the camera operates reliably over a long useful life; the only operation necessary is to periodically replace film, and that is conveniently done in daylight by persons who operate the camera as only a minor incident to other duties.

DETAILED DESCRIPTION

Figure 1:
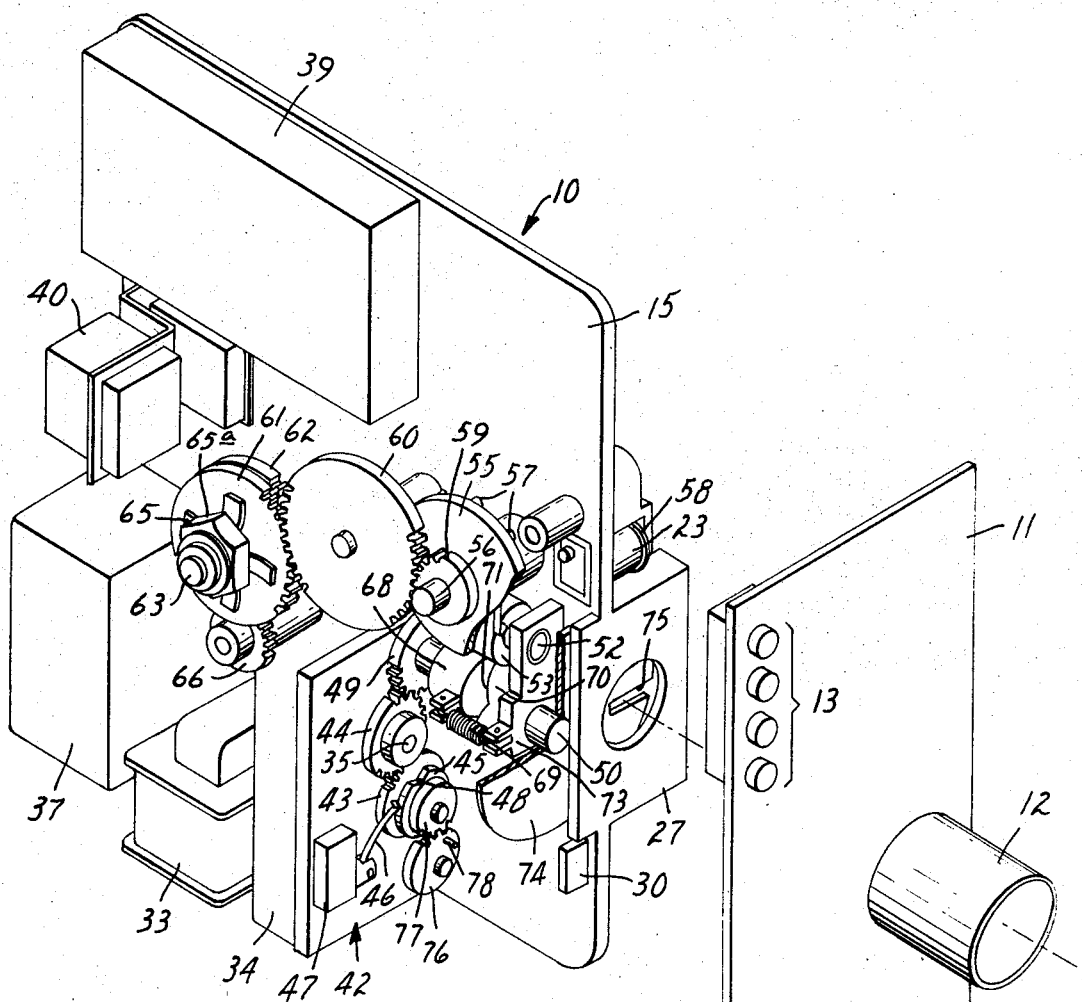
FIG. 1 is a perspective view of internal mechanism of a camera of this invention and of a portion of the front part of the camera case.
Figure 2:
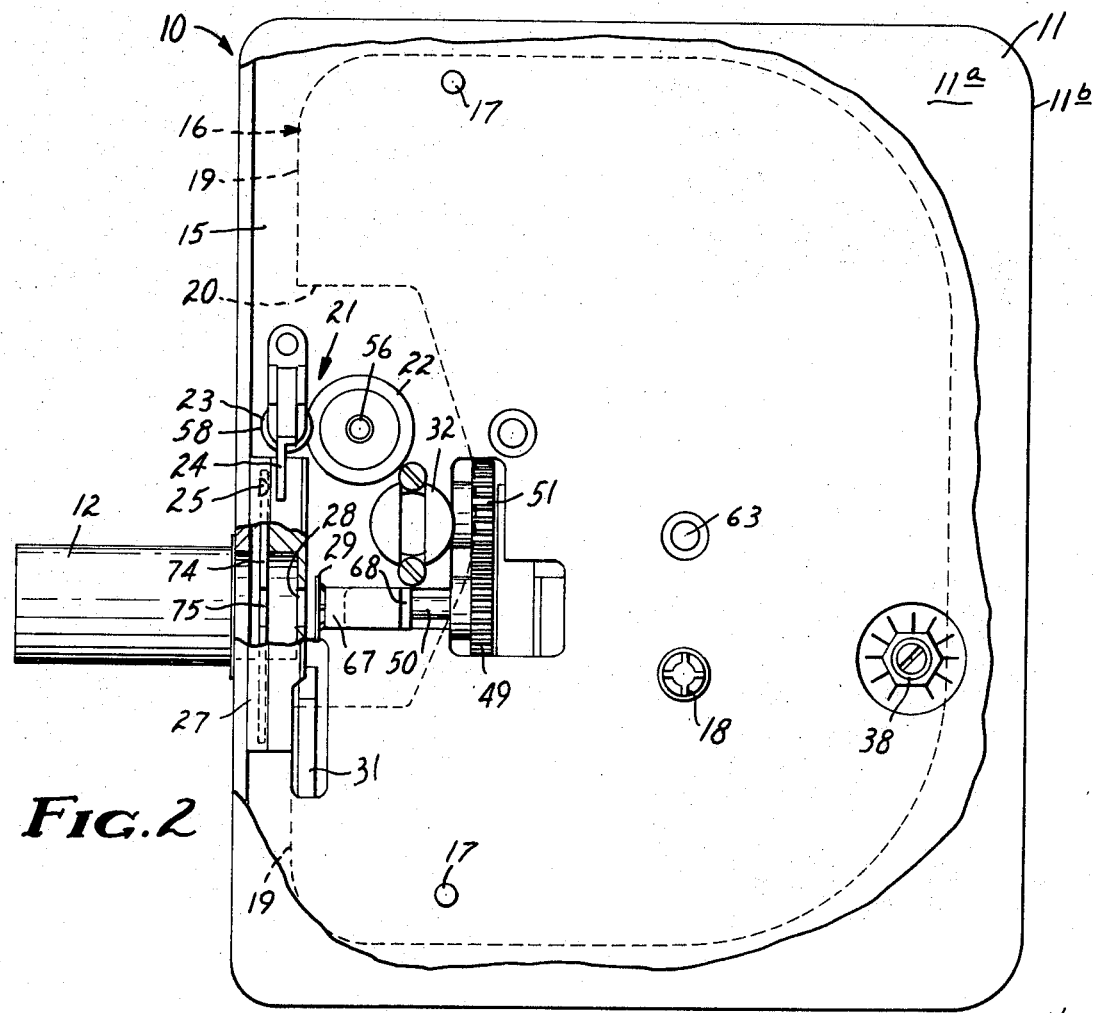
FIG. 2 is a side elevation of the camera shown in FIG. 1, with a portion of the camera sidewall broken away and a film-cartridge shown in place in the camera in dotted lines.

As shown in FIGS. 1 and 2, an illustrative sequence camera 10 of this invention includes an exterior case 11 on which is mounted a lens 12 that defines the light path for the camera. A set 13 of signal lights on the exterior case become illuminated when power to the camera is on, when an exposure is being made, when the camera has completed exposure of most of the film, and when the camera is either exhausted of film or is malfunctioning. In addition, a counter 14 is viewed in an opening in the front of the case to reveal the number of feet of film or the number of frames of film that have been exposed.

Within the case is a base plate 15 that is vertically disposed within the camera, parallel to and adjacent the light path defined by the camera lens. The base plate 15 divides the interior of the camera into a film-receiving compartment and a mechanism-containing compartment. A film cartridge 16 is shown in dotted lines in FIG. 2 in place supported by the base plate in the film-receiving compartment of the camera. In the illustrated embodiment of the invention, the cartridge is provided with recesses that mate with locator pins 17 that extend into the film-receiving compartment from the base plate 15. In preferred embodiments, the base plate is also provided with slightly raised pads that mate in shallow recesses in the sidewall of a molded plastic cartridge, both the height of the pads and the depth of the recesses being held within close tolerances. A spool-drive-pin 18 extends through the base plate for driving engagement within a hub recess of a take-up spool within the film cartridge. Film stored in the cartridge extends from a supply spool, then out of the forward end of one forwardly projecting arm 19 of the cartridge on a straight-line path through a film-handling recess 20 in the cartridge that is large enough to provide room for camera mechanism on both sides of the film and into a second forwardly projecting arm 19 of the cartridge, and then to a take-up spool within the cartridge.

Figure 5:
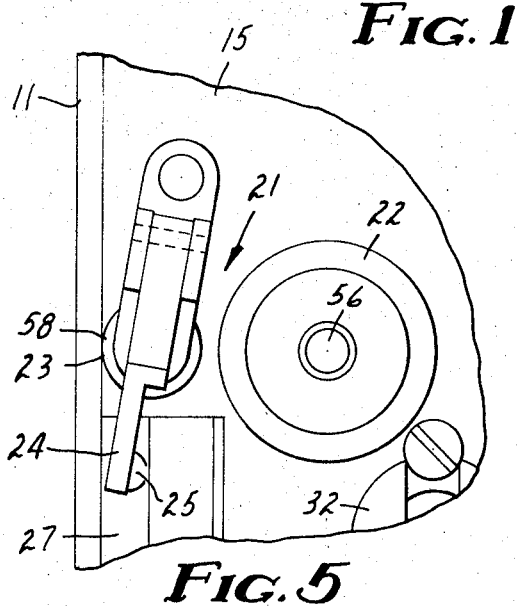
FIG. 5 is an enlarged detail view of a portion of the camera structure shown in FIG. 2.

The exterior length of film in the film-handling recess 20 of the cartridge travels through film-metering mechanism 21 which meters film through the camera in increments sufficient to move an unexposed area of film into the light path. The mechanism 21 comprises a drive roller 22 and idler roller 23 which are spring-biased together but which may be separated as shown in FIG. 5 by pivoting the lever 24 against the spring pressure holding the rollers together. The lever 24 may be positioned behind a detent 25 on a framing plate 27 in the camera to hold the drive roller 22 and idler roller 23 apart and thus free a camera operator's hand for other uses.

The film in the film-handling recess of the cartridge is positioned against the back surface of the framing plate 27 when the cartridge is placed in the cartridge. A rectangular framing aperture 28 in the pressure plate is aligned with the light path defined by the camera lens. A pressure plate 29 is mounted in the camera for reciprocal movement toward and away from film that is passing the framing aperture 28, but the pressure plate is normally spaced from the film except during the brief period that film is being exposed, as will be subsequently explained.

A film-sensor switch 30 attached to the base plate 15 has a feeler arm 31 that extends through an opening in the base plate and is biased into engagement with film traveling through the film-handling recess 20 in the cartridge 16. When film is not in the camera, or when a notch near the trailing end of the film registers with the feeler arm 31, or when the film is distorted out of its normal path by some camera malfunction as failure of the take-up spool to rotate, the feeler arm 31 pivots to operate the switch 30 and complete a circuit to one of the lights 13 on the exterior of the camera case. FIG. 2 also shows a catch 32, and the camera case includes a cover 11a pivotally mounted along the edge 11b of the camera case and latched by inserting a T-shaped rotatable latch into the vertical slot of the catch 32 and then rotating the latch to lock the arms of the "T" within the catch.

An electric drive motor 33 that drives the mechanism of the camera is mounted on the base plate within the mechanism-containing compartment. The drive motor 33 includes a gear box 34 that encloses a gear train that connects the rotating shaft of the motor to a motor output shaft 35. Enclosing the gear train within a gear box reduces the noise produced by the sequence camera. The drive motor 33 is connected to a source of electric power (typically a 110-volt wall outlet) through electric circuitry (not shown) that includes normally open circuit-completing means, such as a solenoid-controlled switch, which is closed upon receipt of electric pulses from a timer 37 that is also mounted on the base plate of the camera. The timer 37 in this illustrative camera is an electronic variable pulsing timer which produced pulses of electric current at predetermined intervals to cause completion of the supply circuit to energize the drive motor 33 and thereby initiate a cycle of camera operation. The rate at which pulses are provided by the timer 37 may be manually changed by rotating a knob 38 on the timer that is exposed in the film-receiving compartment (see FIG. 2).

In this illustrative camera the supply circuit to the drive motor 33 is normally broken and the motor deenergized after completion of one cycle of camera operation by a cycle-spacing mechanism 42 that is driven by the output shaft 35 of the drive motor 33. The cycle-spacing mechanism 42, as shown in FIG. 1, includes a spur gear 43 driven by a spur gear 44 mounted on the motor output shaft 35, a cam 45 fixed to a shaft on which the gear 43 is mounted, a cam follower 46 spring-biased against a cylindrical cam surface of the cam, and a normally closed electric switch 47 that functions as a normally closed circuit-breaking means in the circuit that supplies electric power to the drive motor 33. The switch 47 is opened and operation of the drive motor discontinued when the cam follower 46 registers with a depression 48 in the cylindrical cam surface of the cam 45. Instead of using a cycle-spacing mechanism such as the mechanism 42, the pulse from the timer may simply close the circuit-completing means for a period of time equal to the length of the pulse, and the cycle of camera operation is as long as the pulse from the timer. But the illustrated mechanism is preferred because it does not require that the timer be as carefully constructed as the timer must be in the length of its pulse determines the length of the camera cycle.

The mode of operation of a camera of the invention may also be changed by a remote-control mechanism. The camera illustrated in the drawings includes a receiver 39 which receives signals through an antenna on the camera (not illustrated) from a transmitter located, for example, in an observer's cage of a retail store. The signals are conveyed from the receiver to a relay 40 that operates an alternative circuit-completing means to the electric drive motor 33 and causes the drive motor to run continuously in a series of unspaced cycles of operation.

Figure 3:
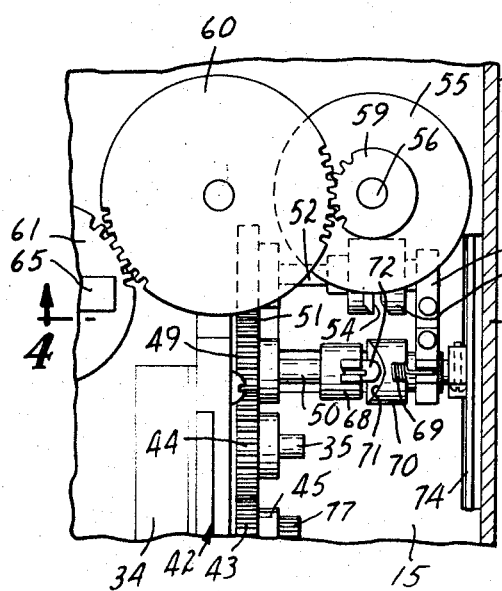
FIG. 3 is a side elevation of a portion of the internal camera mechanism.

The gear 44 on the motor output shaft 35 also is in driving engagement with a spur gear 49 fixed to a cam shaft 50 (see FIG. 3) that controls movement of the pressure plate 29, as will be described in more detail later, and the gear 49 on the shaft 50 is in driving engagement with a spur gear 51 on a cam shaft 52, which is aligned parallel to the light path of the camera. A worm cam 53 (see FIGS. 3 and 4) is fixed on the cam shaft 52 and has a spiral groove 54 formed in its exterior surface. The worm cam 53 engages a pin wheel 55, which is fixed on a shaft 56 mounted at right angles to the cam shaft 52; the shaft 56 extends through the base plate 15 where the drive roller 22 is fixed to it. The pin wheel 55 carries pins 57 extending from one face of the pin wheel and disposed in a circular array around the circumference of the pin wheel, and at the start of a cycle of camera operation one of the pins 57 is engaged in the initial part of the spiral groove 54 of the cam 53. The spiral groove 54 is shaped so that when the cam shaft 52 is driven through a cycle of rotation equal in length to the duration of the cycle of camera operation, the pin wheel undergoes an increment of rotation during only part of the rotation of the shaft 52. The rotation of the pin wheel is sufficient to move the drive roller 22 in an increment of rotation that meters a new or unexposed area of film into alignment behind the framing aperture 28 of the framing plate 27 and into the light path.

The drive roller 22 in the camera illustrated is smooth-surfaced and covered with a layer of high-friction resilient polymeric material such as polyurethane, and the idler roller 23 is tightly pressed against the drive roller so the film does not slip with respect to the drive roller. The idler roller 23 is provided with radially extending flanges 58 at the end of the roller so as to constrain the film in the desired film path. Although nonperforated film makes film-handling and camera-loading more convenient, as well as permitting exposure of nearly the whole width of the film, perforated film can be used in cameras of the invention and the drive roller provided with sprockets to engage in the film perforations. And, although film is less likely to be scratched when a rotatable idler roller is used, the idler roller may be replaced with a different kind of pressure platen.

Figure 4:
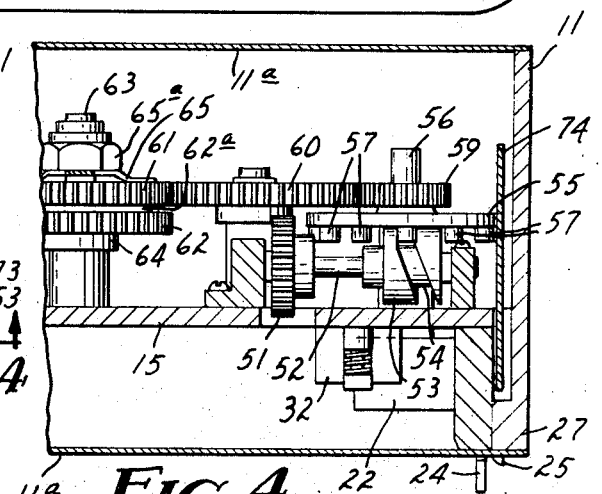
FIG. 4 is a view along the lines 4—4 of FIG. 3.

As shown in FIGS. 1 and 4, a spur gear 59 is fixed to the back of the pin wheel 55 and meshes with an idler gear 60, which in turn drives a spur gear 61. Another spur gear 62, which carries a friction plate 62a, is slidably mounted on the same shaft 63 as the gear 61, and the friction plate 62a is pressed into frictional engagement with the gear 61 by location of the gears between a flange 64 fixed to the shaft 63 and a spring-washer 65 that is held by a nut 65a threaded on the shaft 63. The gear 62 is in driving engagement with a spur gear 66, which is fixed to a shaft that extends through the base plate 15 and terminates as the spool-drive-pin 18. Thus, the spool-drive-pin rotates the take-up spool within the film cartridge at the same time that the drive roller 22 is rotating, and causes the slack between the film-metering mechanism 21 and the take-up spool in the cartridge to be taken up.

The pressure plate 29 is mounted on an arm 67 in line with the framing aperture 28 in the framing plate 27. The arm 67 extends through an opening in the base plate 15 where it terminates as a sleeve 68 slidably mounted on the shaft 50 which carries the spur gear 49. A cam 70 is also fixed to the shaft 50, and this cam includes a cam surface that is transverse to the axis of the shaft and includes a planar surface and a depression 71. A cam follower 72 extends from the sleeve 68, and a tension spring 69 is stretched between the sleeve and a plate 73 fixed to the base plate 15 to urge the cam follower 72 on the sleeve into engagement against the cam surface of the cam. The gear 49, and thus the shaft 50, is driven in an increment of rotation when the gear 44 on the output shaft of the drive motor is moved in an increment of rotation. When the depression 71 in the cam surface registers with the cam follower 72, the sleeve 68 is drawn forward to press the pressure plate 29 against film aligned with the framing aperture 28 of the framing plate. The depression 71 is located in the cam surface so that the pressure plate is pressed against film only when the film has stopped moving and exposure is occurring. Before the cycle of camera operation is completed, the pressure plate 29 is again moved away from the framing plate. FIG. 2 shows the normal position of the pressure plate 29 between cycles of camera operation and during all of each cycle of camera operation except when film is being exposed. In this normal position, film can be conveniently inserted between the pressure plate and framing plate when the camera is loaded with film, and film is not drawn between two fixed surfaces during film advancement. A pressure plate that moves toward and away from the framing plate during a cycle of camera operation is much preferred in cameras of the invention, but in some sequence cameras the pressure plate may be resiliently pressed against the framing plate.

A shutter wheel 74 is fixed on the shaft 50 and extends into an opening in the framing plate to normally block the framing aperture 28. Since the shutter wheel is carried on the shaft 50, it has the same rate of rotation as the cam 70 and always occurs in proper sequence with the reciprocal movement of the pressure plate and also with rotation of the drive roller 22 and spool-drive-pin 18. A slot 75 in the shutter wheel 74 is temporarily aligned with the light path and framing aperture 28 during a cycle of camera operation, after film has stopped its travel and the pressure plate is in engagement with the film.

The counter in the illustrative camera shown in the drawings is a mechanical counter and includes a spur gear 76 driven by a spur gear 77 fixed to the cam 45. A pin 78 extends from the face of the gear 76 at a point radially spaced from the axis of the gear. The pin 78 engages in a slot in a wheel of the counter and drives the counter wheels 14 an amount that represents the amount of film advanced through the camera.

What is claimed is:

1. A compact self-contained sequence camera adapted to receive a film cartridge containing film that is wound on a supply spool and extends to a take-up spool, with a length of film between the supply and take-up spools being exterior to the cartridge and separated from a portion of the exterior cartridge wall to form a space defined by the film and the exterior cartridge wall whereby the film can be engaged on both its surfaces by film-metering mechanism, the camera comprising 1. an exterior case,
2. a lens mounted on the case and defining a light path,
3. a base plate within the case that is parallel to and to one side of the light path and provides a support against which the film cartridge is laid,
4. a framing plate having a framing aperture aligned with the light path and adapted to have the exterior length of film travel over it in line with the framing aperture,
5. drive means for driving the moving parts of the camera in a cycle of camera operation,
6. means for energizing the drive means at selected times,
7. film-metering means including a rotatable drive roller and an idler roller normally resiliently pressed together at a point closely adjacent the framing plate and substantially coplanar with the surface of the framing plate over which film travels but separable to receive the exterior length of film between them as the film cartridge is loaded into the camera, one of the drive roller and idler roller being positioned in said space defined by the film and exterior cartridge wall, whereby an unexposed area of film is advanced past the framing aperture when the drive roller is rotated during a cycle of camera operation,
8. a rotatable spool-drive-pin extending from the face of the base plate and adapted to drivingly engage within a hub recess in the take-up spool in the film cartridge to rotate the take-up spool,
9. a pressure plate that undergoes reciprocal movement toward and away from the framing plate during a cycle of camera operation and that is normally spaced from the framing plate between cycles of camera operation, leaving a straight-line uninterrupted opening between the framing plate and the pressure plate that is in full communication with the space around the opening opposite the base plate, whereby, when the film cartridge is loaded into the camera, the exterior length of film from the film cartridge can be inserted edgewise between the framing plate and pressure plate without bending the film, with the pressure plate entering the space defined by the film and exterior cartridge wall, and
10. a rotatable shutter wheel that normally blocks the framing aperture but has an opening that is aligned with the frame-defining aperture during part of the rotation of the shutter wheel, a cycle of camera operation including (a) an increment of rotation of the shutter wheel, (b) an increment of rotation of the drive roller and spool-drive-pin at a time when the opening in the shutter wheel is not aligned with the framing aperture in the framing plate, and (c) reciprocal movement of the pressure plate to first press film against the framing plate during the time the opening in the shutter wheel is aligned with the framing aperture and then separate the pressure plate from the framing plate.

2. A camera of claim 1 in which the drive means includes an electric drive motor supplied from an electric power supply through a circuit that includes normally open circuit-completing means and normally closed circuit-breaking means and having an output shaft driven in rotary movement by the drive motor, and the means for energizing the drive means includes (a) a timer that sends electric pulses to close the circuit-completing means at predetermined intervals, (b) a cam driven by the motor output shaft having an irregularity in its cam surface, and (c) a cam follower engaging the cam and connected to open the normally closed circuit-breaking means when the cam follower registers with the irregularity in the cam surface.

3. A camera of claim 1 in which the drive roller is smooth-surfaced and carries a high-friction exterior layer of a resilient polymeric material.

4. A camera of claim 1 having a pivotable film-sensing arm resiliently positioned in the normal path of the exterior length of film when the film cartridge is in place in the camera, and the film-sensing arm is connected to actuate warning apparatus when film is absent from the normal path of the exterior length of film.

5. A camera of claim 1 in which the drive means includes an electric drive motor having an output shaft driven in rotary movement by the electric driver motor and a first cam shaft parallel to the light path and driven by the motor output shaft, the first cam shaft carrying a cam and a cam follower connected to the pressure plate and moved by the cam in reciprocal movements along the first cam shaft.

6. A camera of claim 1 in which the drive means further includes a second cam shaft parallel to the light path, driven by the motor output shaft, and carrying a cam that drivingly engages a wheel on a shaft that is mounted at right angles to the second cam shaft, and the right-angle shaft extends through the base plate and carries the drive roller.

7. A camera of claim 6 in which a gear is attached to the right-angle shaft and drives an input gear that is connected to an output gear through a slip clutch, and the output gear drives the spool-drive-pin.

8. A camera of claim 6 in which the cam on the second cam shaft has a spiral groove, and the wheel engaged by the cam has a set of pins extending from one face of the wheel and disposed in a circular array around the circumference of the wheel, with one of the pins engaged in the spiral groove in the cam on the second cam shaft during a cycle of camera operation.

9. A camera of claim 6 in which the shutter wheel is fixed on one of the two cam shafts.

10. A compact self-contained sequence camera adapted to receive a film cartridge containing film that is wound on a supply spool and extends to a take-up spool, with a length of film between the supply and take-up spools being exterior to the cartridge and separated from a portion of the exterior cartridge wall to form a space defined by the film and the exterior cartridge wall whereby the film can be engaged on both its surfaces by film-metering mechanism, the camera comprising 1. an exterior case,
2. a lens mounted on the case and defining a light path,
3. a base plate within the case that is parallel to and to one side of the light path, and provides a support against which the film cartridge is laid, the base plate defining a film-receiving compartment and a mechanism-containing compartment
4. a framing plate having a framing aperture aligned with the light path and adapted to have film travel over it in line with the framing aperture,
5. an electric drive motor mounted in the mechanism-containing compartment having an output shaft aligned parallel to the light path,
6. timer means mounted in the mechanism-containing compartment for periodically energizing the drive motor to cause a cycle of camera operation, the timer means including
   a. a timer that provides pulses of electric current at predetermined periodic rates that may be selected by manually operated control means mounted on the camera,
   b. circuit means connecting the timer to the drive motor whereby the pulses initiate energization of the drive motor to begin a new cycle of camera operation, and
   c. cycle-spacing means including (i) an electric switch in the circuit that supplies electric power to the drive motor, (ii) a rotatable cam driven by the output shaft of the drive motor, and (iii) a cam follower that engages the cam and operates the electric switch, the cam surface of the cam being contoured to operate the electric switch and interrupt the supply of electric power to the drive motor when the drive motor has driven the output shaft through a predetermined angle of travel,
7. film-metering means including
   a. a rotatable drive roller and an idler roller resiliently pressed together at a point closely adjacent the framing plate and substantially coplanar with the surface of the framing plate over which film travels but separable to receive the exterior length of film between them as the film cartridge is loaded into the camera, one of the drive roller and idler roller being positioned in said space defined by the film and exterior cartridge wall, whereby an unexposed area of film is advanced over the framing aperture when the drive roller is rotated during a cycle of camera operation,
   b. a first cam shaft driven with the motor output shaft during a cycle of camera operation and mounted parallel to the light path,
   c. a wheel having an axis at right angles to the first cam shaft and drivingly connected to the first cam shaft, and
   d. shaft means connecting the wheel and drive roller whereby the drive roller is rotated during a cycle of camera operation, 8. a spool-drive-pin extending into the film-receiving compartment from the base plate and adapted to drivingly engage in a hub recess of a take-up spool mounted in the film-receiving compartment and connected to the first cam shaft by gear train means that includes a slip clutch whereby the spool-drive-pin is rotated during a cycle of camera operation when not prevented by film tension,
9. pressure plate means comprising
    a. a second cam shaft driven with the motor output shaft during a cycle of camera operation and mounted parallel to the light path,
    b. a cam on the second cam shaft having a cam surface transverse to the axis of the second cam shaft,
    c. a cam follower pressed against the transverse cam surface by spring means, the cam surface being contoured to cause the cam follower to undergo reciprocal movement along the axis of the second cam shaft during a cycle of camera operation, and
    d. a pressure plate attached to the cam follower, the pressure plate being normally spaced from the framing plate leaving a straight-line uninterrupted opening between the framing plate and the pressure plate that is in full communication with the space around the opening opposite from the base plate whereby, when the film cartridge is loaded into the camera, the exterior length of film from the film cartridge can be inserted edgewise between the framing plate and pressure plate without bending the film, with the pressure plate entering the space defined by the film and exterior cartridge wall, the pressure plate being moved toward the framing plate during forward movement of the cam follower to press film between the pressure plate and framing plate, and
10. a rotatable shutter wheel that normally blocks the framing aperture but has an opening that is aligned with the framing aperture during part of the rotation of the shutter wheel, a cycle of camera operation including (a) an increment of rotation of the shutter wheel, (b) an increment of rotation of the drive roller and spool-drive-pin at a time when the opening in the shutter wheel is not aligned with the aperture in the framing plate, and (c) reciprocal movement of the pressure plate to first press film against the framing plate during the time the opening in the shutter wheel is aligned with the framing aperture and then separate the pressure plate from the framing plate.

* * * * *